(12) United States Patent
Normark et al.

(10) Patent No.: US 8,185,090 B2
(45) Date of Patent: *May 22, 2012

(54) METHOD AND SYSTEM FOR PROVISIONING CONTENT IN A MOBILE DEVICE MANAGEMENT SYSTEM

(75) Inventors: Magnus Normark, Bromma (SE); Britt-Mari Svensson, Sollentuna (SE)

(73) Assignee: Smarttrust AB, Stockholm (SE)

( * ) Notice: Subject to any disclaimer, the term of this patent is extended or adjusted under 35 U.S.C. 154(b) by 544 days.

This patent is subject to a terminal disclaimer.

(21) Appl. No.: 12/159,227

(22) PCT Filed: Dec. 27, 2006

(86) PCT No.: PCT/SE2006/001504
§ 371 (c)(1),
(2), (4) Date: Oct. 10, 2008

(87) PCT Pub. No.: WO2007/075136
PCT Pub. Date: Jul. 5, 2007

(65) Prior Publication Data
US 2009/0318125 A1    Dec. 24, 2009

(30) Foreign Application Priority Data
Dec. 28, 2005  (SE) ...................................... 0502942

(51) Int. Cl.
*H04M 1/66* (2006.01)

(52) U.S. Cl. ..................... 455/411; 455/414.4; 455/558; 235/380

(58) Field of Classification Search ................... 455/414, 455/558, 418, 419, 414.1, 432.3, 435.1, 404.2, 455/432.2, 440, 412; 709/246, 203
See application file for complete search history.

(56) References Cited

U.S. PATENT DOCUMENTS

| 6,922,721 | B1* | 7/2005 | Minborg et al. | 709/219 |
| 7,636,792 | B1* | 12/2009 | Ho | 709/246 |
| 2004/0082346 | A1* | 4/2004 | Skytt et al. | 455/456.3 |
| 2005/0039178 | A1* | 2/2005 | Marolia et al. | 717/168 |
| 2007/0093243 | A1* | 4/2007 | Kapadekar et al. | 455/419 |

FOREIGN PATENT DOCUMENTS
EP    1519600    3/2005

OTHER PUBLICATIONS

Open Mobile Alliance Ltd., OMA Device Management Tree and Description. 2005.

* cited by examiner

*Primary Examiner* — Kamran Afshar
*Assistant Examiner* — Kenneth Corbin
(74) *Attorney, Agent, or Firm* — Fasth Law Offices; Rolf Fasth (57) ABSTRACT

The provisioning content in a device management system facilitates provisioning of mobile devices with contents of non-applicable formats for provisioning in a module therein in a device management system in a mobile network infrastructure. The system has a device management application and repositories. Capabilities of a mobile device are checked from one or more repositories of the device management system. The provisioning content is retrieved from a module in a mobile device and converted into an applicable format for provisioning the device.

18 Claims, 4 Drawing Sheets

METHOD AND SYSTEM FOR PROVISIONING CONTENT IN A MOBILE DEVICE MANAGEMENT SYSTEM

PRIOR APPLICATIONS

This is a US national phase patent application that claims priority from PCT/SE2006/001504 filed 27 Dec. 2006, that claims priority from Swedish Patent Application No. 0502942-6, filed 28 Dec. 2005.

TECHNICAL FIELD

Method for provisioning content in a device management system in order to facilitate provisioning of mobile devices with contents of non-applicable formats for provisioning in a module therein in a device management system in a mobile network infrastructure, the system comprising a device management application and repositories.

BACKGROUND AND SUMMARY OF THE INVENTION

The Global System for Mobile Communication (GSM) is a standard for digital wireless communications with different services, such as voice telephony. The Subscriber Identity Module (SIM) inside GSM phones was originally designed as a secure way to connect individual subscribers to the network but is nowadays becoming a standardized and secure application platform for GSM and next generation networks.

The Mobile Station (MS) is what the user ever sees from the whole system. The MS actually consists of two distinct entities. The actual hardware is the Mobile Equipment (ME), which consists of the physical equipment, such as the radio transceiver, display and digital signal processors. The subscriber information is stored in the Subscriber Identity Module (SIM), implemented as a Smart Card.

With respect to the terminology used in this document, The Mobile Station (MS) includes the Mobile Equipment (ME) and the Subscriber Identity Module (SIM). The terms "Handset" and "Terminal" are used as a synonym to the Mobile Equipment (ME) and the term "Mobile device" as a synonym to The Mobile Station (MS).

The mobile equipment is uniquely identified by the International Mobile Equipment Identity (IMEI) being a unique code that corresponds to a specific GSM handset while the SIM card, in turn, is identified by the Integrated Circuit Card Identity (ICCID) determining the serial number of the card, and contains the International Mobile Subscriber Identity (IMSI), identifying the subscriber, a secret key for authentication, and other user information. The IMEI and the IMSI or MSISDN are independent and can thereby provide personal mobility.

The Mobile Station Integrated Service Digital Network Number, MSISDN, is the standard international telephone number used to identify a given subscriber. The operator declares the subscription in a database inside the network, which holds the correspondence between the IMSI and the MSISDN. By inserting the SIM card into another GSM terminal, the user is able to receive and make calls from that terminal, and receive other subscribed services.

Advanced mobile services such as browsing, multimedia messaging, mobile e-mail, and device management can only be used if a mobile phone is configured correctly. However, many customers do not know how to configure their device. Operators must ensure that device configuration is quick and easy for the customer. This process of managing device settings and applications is called device management.

A device management session includes e.g. authentication (user verification), device inventory (a device management application read which parameters and applications are installed in the telephone for future decisions, such as e.g. updating, adding and deleting things from the installations), continuous provisioning (a device management application e.g. updates parameters on the telephone device, sends applications to the device, performs software and firmware updates), device diagnostics (error finding), etc.

Sending new settings over the air is one simple way to provision a device with configuration parameters, such as connectivity information (device settings). After receiving the settings to configure the phone, the customer simply saves them to the phone and is then able to use the services. For the operator, simplifying access to advanced services can bring higher usage rates, new revenue streams, and reduced customer helpline costs.

However, a mobile device consists of two entities: the subscriber identity module (SIM) and the terminal. In a mobile device management environment both entities that make up the "device" are of interest. Both those entities are subject to mobile device management operations.

In a unified device management environment a "device" consists of two entities. For some devices it is the data objects residing in the terminal that are targeted and sometimes it is data objects residing on the SIM. This means that the format of the provisioning content is significantly different even if the parameters may be the same. It is a jungle to keep track of the details of how a particular mobile device needs to be managed.

It is also a problem that there might be different solutions for different mobile devices. One device might have Multimedia Message Service (MMS) settings on the SIM card and another device might have them in an OMA DM management Object (MO) in the terminal.

Furthermore, the fact that a mobile device consists of two independent units, the terminal and the SIM, introduces an additional level of complexity. The SIM card might support storing of MMS settings on the SIM card but then there has to be an application program in the terminal that supports reading the settings off the SIM card.

Therefore the capabilities of both the SIM and the terminal need to be analysed in combination in order to determine the applicable provisioning protocol and provisioning content format. To simply look at the capabilities of the terminal alone will not be enough.

For devices supporting OMA DM, data residing in the handset is represented by standardized Management Objects (MO) as specified by the OMA DM protocol. The protocol specifies how the MOs may be managed (i.e. read, updated, deleted . . . ) by a remote server side component. There are just a few, three actually, MOs that are specified as mandatory. In addition to those mobile device vendors will implement more MOs according to their own needs and ideas.

There are also plenty of "legacy" devices that have data stored in the handset in a non-specified proprietary way and in such cases there is sometimes a proprietary device management protocol available that is adhered to by one or more terminal manufacturers. The device management protocols used for communicating with terminal residing application programs and SIM residing application programs are essentially different. The application programs and their respective communication protocols have evolved one by one often on a proprietary basis. Some companies, have published their own specifications of protocol and format for provisioning their mobile devices with e.g. connectivity parameters over-the-air (OTA). Such proprietary "legacy" OTA provisioning protocol are still being used.

There are multiple data objects specified for storing the same data. Multiple standards and specifications exist for how to maintain connectivity parameters in a mobile device, e.g. on the SIM card, in an MO in the OMA DM user agent, as an XML document or proprietary somewhere in the phone.

OMA Device Management Protocol (OMA DM) is a standard for communication between mobile devices and device management server systems. The standardization body is OMA, Open Mobile Alliance. The mobile device to be managed is equipped with an OMA DM user agent in the device (i.e. terminal or handset) that speaks the OMA DM language.

Device management applications using OMA DM are typically used by mobile service providers. They are used for customer care purposes and to increase revenue by effective value added service management. Example use-cases involve service- and settings provisioning, device diagnostics, statistics, firmware- and software upgrade.

In this document, a system that is able to manage both the handset and the SIM card is referred to as a Unified Device Management system (UDM). In the scope of UDM, both the SIM residing and the terminal residing data and application programs are of interest and must be managed.

In this document, the term SIM file management (SFM) is used for device management operations towards SIM cards. Data residing on the SIM are represented by a SIM file structure where a file is indicated by a file path. How the data in the SIM files should be encoded is specified to the transport level as well as to the application level. There are several standards around, both from 3rd Generation Partnership Project (3GPP) and Open Mobile Alliance (OMA). The original scope of 3GPP was to produce globally applicable Technical Specifications and Technical Reports for a 3rd Generation Mobile System based on evolved GSM core networks and the radio access technologies that they support and was subsequently amended to include the maintenance and development of the Global System for Mobile communication (GSM) Technical Specifications and Technical Reports including evolved radio access technologies.

To keep track of what SIM card and terminal that has what files and what data management objects, capabilities are used. For example a terminal may be capable of using the OMA DM device management protocol by an OMA DM user agent supporting OMA DM version 1.2, by an OMA DM user agent supporting a number of optional OMA DM functions or it might be capable of accepting unprompted notification messages of Multipurpose Internet Mail Extensions (MIME) type. MIME extends the format of Internet.

By keeping track of such capabilities, adaptive processes may be implemented, that automatically selects and imposes the applicable device management protocols and formats. Of course, the foundation of it all is that the system is aware of the mobile device identity and has repositories storing capabilities for both SIM cards and terminals.

Throughout this document, and also in standards, the term "provisioning content" (PC) is frequently used. Provisioning content is the content being provisioned. Content is like payload. In the use-case "provisioning of device settings" the provisioning content is the set of connectivity parameters. But this is just one use-case. The content in other use-cases may be e.g. software of some sort, a game, a picture or a firmware update package.

Whatever the content is it always has a dedicated format. The same provisioning PC may be provisioned to various different devices over various different protocols and packaged in various different formats.

The capabilities of the mobile device reveal what features, provisioning protocols and provisioning content formats it is capable of understanding.

This means that, in the present situation, "bridging features", "adaptive processes", "automatic conversion features" and "data management tools" are or would be extremely useful in order to enable seamless migration and easy-to-use future proof mobile device management systems. There will be a lot of "legacy" devices out there for quite some time yet. Meanwhile, screening out devices based on their capabilities is of essential importance.

Capabilities aware processes, meaning the terminal capabilities as well as SIM card capabilities. Capabilities refer to both "hard" capabilities such as mobile transport capabilities and more "soft" capabilities such as the presence of certain application programs on the terminal or SIM. Capabilities repositories enable screening out of devices with certain desired capabilities.

Unifying management of SIM card and terminal, seamless migration back and forth, uniform interfaces for UDM applications including automated protocol conversion Bridging features, enabling uniform use-case based system that operates smoothly even as SIM cards and terminals evolve over time, causing a ruthless demand for yet new device management protocols and data formats again and again. Bridging features ensures seamless migration from one protocol to the next. In addition, bridging features ensures seamless management of all generation of devices existing at the same time in one and the same mobile device management system.

Thus, the correct format for a provisioning content is determined by a complex combination of capabilities: the OTA protocol, even the OTA protocol version, the terminal vendor, terminal model, the subscription type and the SIM card type. It is very complex to know by which provisioning content format a mobile device may be provisioned.

US patent application 2005055453 is presented as prior art. This patent is held by Microsoft and covers a specific conversion, from WAP client provisioning XML representation into OMA DM tree structure representation. The method in this patent does not include the use of capabilities to determine what conversion that is applicable. It is a straight forward computerized conversion where data objects of one format are mapped onto data objects of another. In addition the patent is limited to conversion between to specific formats.

A mobile device management system can be based on the key feature of storing provisioning content on the SIM card. However, there are some problems with implementing such a system since neither all SIM cards nor all terminals supports the concept.

All terminals do not for example support bootstrapping from SIM cards and all SIM cards do not support storing of provisioning content on the card. Terminals might also have multiple application programs, e.g. one for MMS, one for internet browsing, one for OMA DM etc., each with different capabilities where bootstrapping from SIM card is concerned.

If this is not the case, the mobile operator cannot use the easy, safe and suited for the purpose distribution of provisioning content on the SIM cards along with the subscription. Instead they need multiple systems implementing multiple device management protocols to provision settings OTA at a later point in time. A severe consequence is that subscribers are left without settings. Subscribers can then not start using application services immediately. In the worst scenario the mobile operator does not have a mobile device management system ensured with discovering devices and therefore is left with the only option to wait for the end-user to initiate bootstrap.

There is more than one specification specifying how to store provisioning content on SIM. MMS settings are specified by 3GPP and OMA Dm settings by OMA Different solutions for different mobile devices are also a problem, one device might have MMS settings on the SIM card and another might have them in an OMA DM MO.

Furthermore, the fact that a mobile device consists of two independent units, the terminal and the SIM, introduces an additional level of complexity. The SIM card might support storing MMS settings on the SIM card but if there is no application program in the terminal that supports reading the settings off the SIM card.

The object of the invention is to develop methods and systems for how bridging features may be provided in order to enable a Mobile Device Management (MDM) system based on the key feature of storing provisioning content on the SIM card or other modules in a mobile device.

The method of the invention is for provisioning content in a device management system in order to facilitate provisioning of mobile devices with contents of non-applicable formats for provisioning in a module therein in a device management system in a mobile network infrastructure. The system comprises a device management application and repositories, and in the method, the following steps are performed by the management application, which consist of checking the capabilities of a mobile device from one or more repositories of the device management system, retrieving the provisioning content from a module in a mobile device, converting the provisioning content into an applicable format for provisioning, and provisioning the device.

The system of the invention comprises one or more device capabilities repositories, a device management application used for checking of the capabilities of a mobile device from one or more repositories of the device management system, retrieving the provisioning content from a module in a mobile device, converting the provisioning content into an applicable format for provisioning, and for provisioning the terminal.

The starting point for this invention is the idea of an enabling bridge-and-hide feature in the mobile device management system that lets a mobile service provider introduce and deploy provisioning content stored on SIM one-sidedly.

It is a fact that not all SIM cards support storing provisioning content. Neither do all terminals support bootstrapping from the SIM card. (I.e. reading the provisioning content from the SIM card and installing the connectivity parameters in the respective terminal applications.)

The intention is to enable the Mobile Device Management (MDM) system to apply the concept as if all devices actually supported storing provisioning content on the SIM card and bootstrapping via SIM. The invention lets the mobile service provider one-sidedly decide to deploy provisioning content stored on the SIM even if the mobile devices do not support it.

The solution is an innovative method to manage the provisioning content seamlessly and independently of storage media. In implementation, the provisioning content may be stored in a network side database or on the SIM card. But in concept, and as seen from the system user, the provisioning content is stored on the SIM card. (It is virtually on the SIM card all the time.)

The invention covers an adaptive bridging feature that takes care of the management of provisioning content that is stored on the SIM card.

A rough introductory feature description:

If the terminal cannot read provisioning content from SIM, or if the terminal does not support bootstrapping from the SIM card then the invention reads the parameters off the SIM, and returns them to (provision) the terminal instead and the invention can take the necessary actions to bootstrap the mobile device via the SIM card. Thus, the invention retrieves the provisioning content from the SIM card and converts the format into the applicable terminal bound OTA provisioning protocol. In this way, the provisioning content reaches its destination in the terminal, from the SIM card and back to the terminal where the parameters are installed.

If the SIM card cannot store the provisioning content, then the invention provisions the terminal directly with parameters from a database on the server side If the SIM card has not been pre-provisioned, the invention provisions the SIM card with the provisioning content, in order to let the terminal bootstrap via the SIM card.

The method is based on a capabilities aware mobile device management system. What that means is that the system can determine how and by what means provisioning content is managed by a mobile device. This is achieved by the use of capabilities repositories.

Which protocol and format that is applicable for provisioning will depend on a complex combination of all of the device capabilities. For example, for one mobile device, settings for Multimedia Service (MMS) might be residing in a SIM file and settings for OMA DM in an MO in the terminal. While for another terminal both kind of settings are stored in MOs in the terminal. Adaptive processes are necessary to manage.

Nowadays most mobile devices support some kind of OTA provisioning. There are OTA provisioning protocols for terminal residing data and SIM residing data.

For terminal residing data objects:

"Legacy" protocols that are based on short messages (SMS) to carry the provisioning content using to a dedicated data format of the application data unit. The legacy protocols use several vendor specific (proprietary) formats to carry the provisioning content.

OMA Client Provisioning that uses an XML document to carry the provisioning content. There is a dedicated OMA specification that specifies the provisioning content markup.

OMA DM Bootstrap that uses an XML document to carry the provisioning content. (Applies to connectivity parameters for OMA DM protocol only). This markup is different from the OMA CP markup, i.e. a different format For SIM residing data objects:

RFM is the OTA provisioning protocol carried over SMS. Part of determining the provisioning content "format" is to determine the identity of the files (EF) to which the provisioning content shall be written. Part is to determine how the provisioning content itself should be encoded. Part is to determine by the SIM card type whether there is any particular flavor of RFM protocol to be used. In the SIM case protocol and format is therefor tightly connected.

In order to implement the determination process, by which the correct provisioning content format is selected there is a need for terminal and SIM card type specific capabilities.

In the invention, repositories for terminal capabilities and SIM card capabilities are used for the process of determining the provisioning content format. Capabilities repositories are essential for managing the provisioning. For example: in some mobile device model it is the provisioning content resides in terminal media and in some other it resides on-SIM. It is the same old connectivity parameters, but the provisioning protocols and content formats are significantly different depending on where and how it is stored in the mobile device The invention covers conversion of a format applicable for SIM residing data objects into terminal residing data objects. Nowadays most mobile devices support some kind of Over-The Air (OTA) provisioning. There are OTA provisioning protocols for terminal residing data and SIM residing data.

For terminal residing data objects, there are s.c. a) "Legacy" protocols that are based on short messages (SMS) to carry the provisioning content using to a dedicated data format of the application data unit. The legacy protocols use several vendor specific (proprietary) formats to carry the provisioning content, b) an Open Mobile Alliance (OMA) Client Provisioning specification that uses an XML document to carry the provisioning content. The dedicated OMA specification that specifies the provisioning content markup, c) an OMA DM Bootstrap specification that uses an XML document to carry the provisioning content. This markup is different from the OMA CP markup, i.e. have a different format.

For SIM residing data objects, there is the Remote File Management (RFM) protocol, which is the OTA provisioning protocol carried over SMS.

The method and system implements:

Device management repositories facilitating the possibility to determine the correct provisioning content format based on the capabilities of the terminal and the SIM card constituting the mobile device:

A terminal capabilities repository (TCR) storing information about what application services, technologies and so on that a terminal is capable of. The TCR also stores information about what OTA provisioning protocols a terminal may be provisioned over and specific information about provisioning content format particulars when so needed.

A SIM card capabilities repository (SCR) storing information about the management objects (files) available on the SIM card and whether or not these file may be managed from remote.

A subscription- and SIM card relationship repository storing information about the capabilities of the SIM card for a particular subscription. Thereby this repository provides the means to match a subscription with a SIM card type.

A device identities repository (DIR) storing the mobile device identities as identified by a terminal identity and a subscription identity [IMEI, MSISDN].

Once the applicable format has been determined the method automatically implements the actual conversion from a SIM card provisioning content format into the into the particular terminal applicable format based on the capabilities of the mobile device targeted.

The invention covers conversion from formats applicable for SIM residing data objects into formats applicable for terminal residing data objects. The formats may be any, both standardised formats as well as proprietary formats.

In the following the invention will be described by means of some typical examples by referring to figures. The intention is not to restrict the invention to these examples because they are presented to illustrate the invention only.

DETAILED DESCRIPTION

Figure 1:
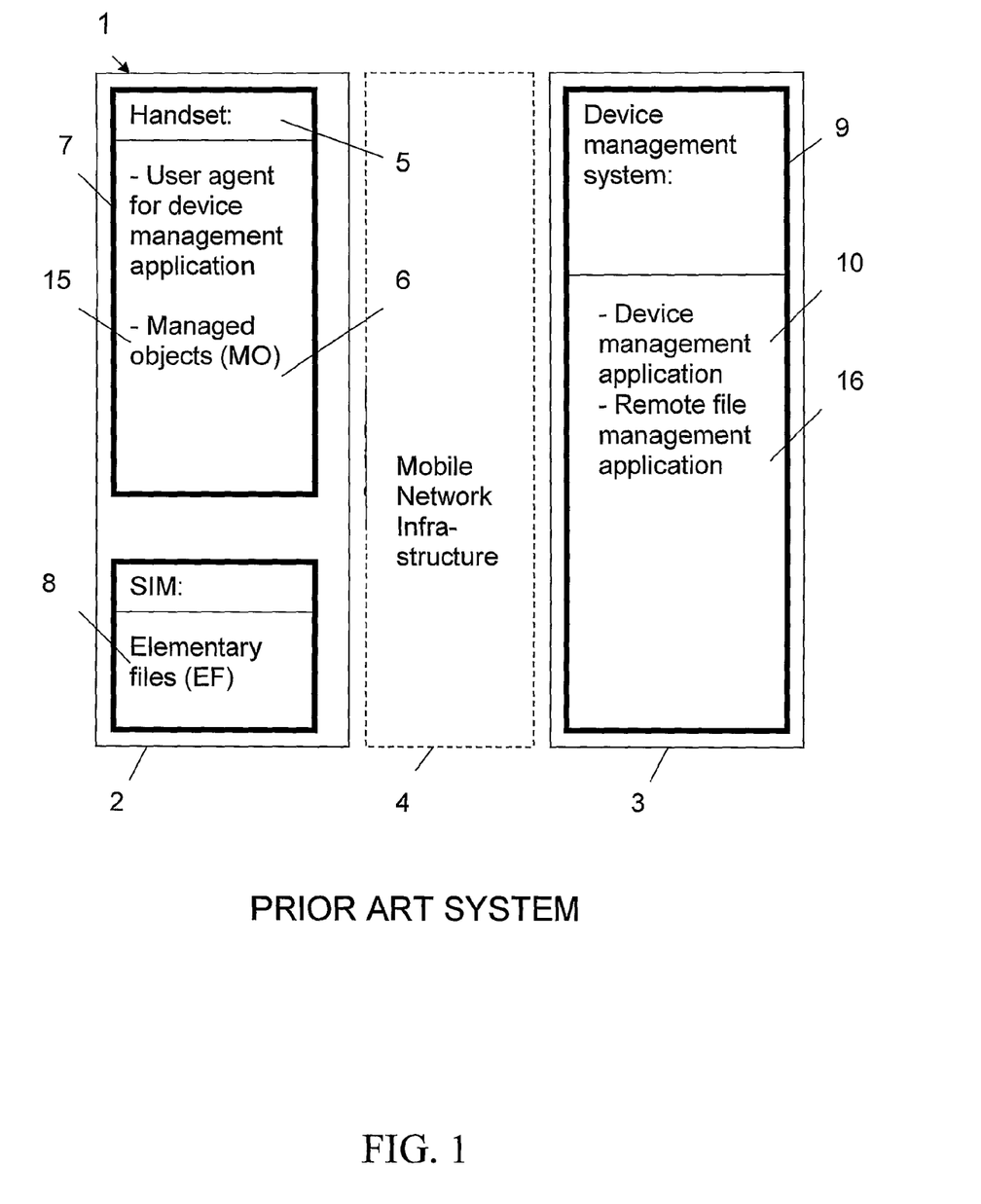
FIG. 1 is a view of a prior art target environment without the invention

FIG. 1 is a view of a prior art target environment without the invention. The target environment is presented as an example of a telecommunication network 1 in which the invention can be used. The telecommunication network 1 comprises one or more devices to be provisioned, of which one device 2 and a device management server 3 can be seen in FIG. 1. The device 2 to be provisioned is in this example a mobile device 2 belonging to the mobile network infrastructure 4.

The Mobile Station (MS) (=The device) represents the only equipment the GSM user ever sees from the whole system. It actually consists of two distinct entities. The actual hardware is the Mobile Equipment (ME) (=handset) marked with reference number 5 in FIG. 1, which consists of the physical equipment, such as the radio transceiver, display and digital signal processors. The subscription information is stored in the Subscriber Identity Module (SIM), marked with reference number 6 in FIG. 1, implemented as a Smart Card.

In this context, the mobile network infrastructure includes all components and functions needed for mobile data communication, both GSM and internet included. The mobile device 2, in turn, includes both the handset 5 and the SIM card 6. Thus, the mobile device 2 has access to the mobile network infrastructure 4.

OMA Device Management Protocol (OMA DM) is one standard for communication between devices and applications in device management systems. If this standard is used, the device to be managed (for example provisioned), i.e. the mobile station 2 in FIG. 1, is equipped with an OMA DM user agent 7 in the device 2 that speaks the OMA DM language. With other device management protocols, the user agent 7 is a user client for the particular device management application used in the device management system 9. The data entities residing in the handset 5 (i.e. Mobile Equipment (ME)) are represented by standardized Managed Objects (MO) 15. When the protocol used is OMA DM, these are specified by the OMA DM protocol.

The data entities residing in the SIM card, in turn, are represented by a logical structure of files, including the Elementary Files (EF) having reference number 8 in FIG. 1. The SIM files 8 can be remotely managed by standardized commands for remote file management by means of a standardized remote file management application 16, such as RFM, in the device management system 9. The device management system 9 of FIG. 1 also has a device management application 10 for managing the managed objects (MO) 15 using a device management protocol, which e.g. can be OMA DM, which is typically used by mobile service providers. The applications 10, 16 are in reality on different servers and thus the server 3 has to be considered as a common expression for applications on server side. The applications are used for customer care purposes and to increase revenue by effective value added service management.

Thus, in summary, the mobile device 2 of FIG. 1 comprising the handset 5 and the SIM card 6 is subject of device management in a multi-protocol mobile device management environment. The data entities 15, i.e. the managed objects, in the handset are then manipulated by management operations carried over a standardized protocol, i.e. the OMA DM protocol in this example. The user agent 7 is the client side component required to carry out device management operations over the OMA DM protocol. The data entities 8, i.e. the elementary files, in the SIM card may in turn be manipulated by management operations carried over Remote File Management (RFM) protocols. The data entities, MO's and EF's, may not be managed over the same device management protocol.

A device management session includes e.g. provisioning meaning that the device management application e.g. updates parameters on the telephone device, sends applications to the device, and performs software/firmware updates. Thus, sending new settings over the air is a way to provision a device with configuration parameters, such as connectivity information (device settings). After receiving the settings to configure the phone, the customer simply saves them to the phone and is then able to use the services.

In provisioning, for some devices it is the data objects residing in the terminal that are targeted and sometimes it is data objects residing on the SIM. This means that the format of the provisioning content is significantly different even if the parameters may be the same. It is also a problem that there might be different solutions for different mobile devices. Furthermore, the fact that a mobile device consists of two independent units, the terminal and the SIM, introduces an additional level of complexity. The SIM card might e.g. support storing of MMS settings on the SIM card but then there has to be an application program in the terminal that supports reading the settings off the SIM card.

Figure 2:
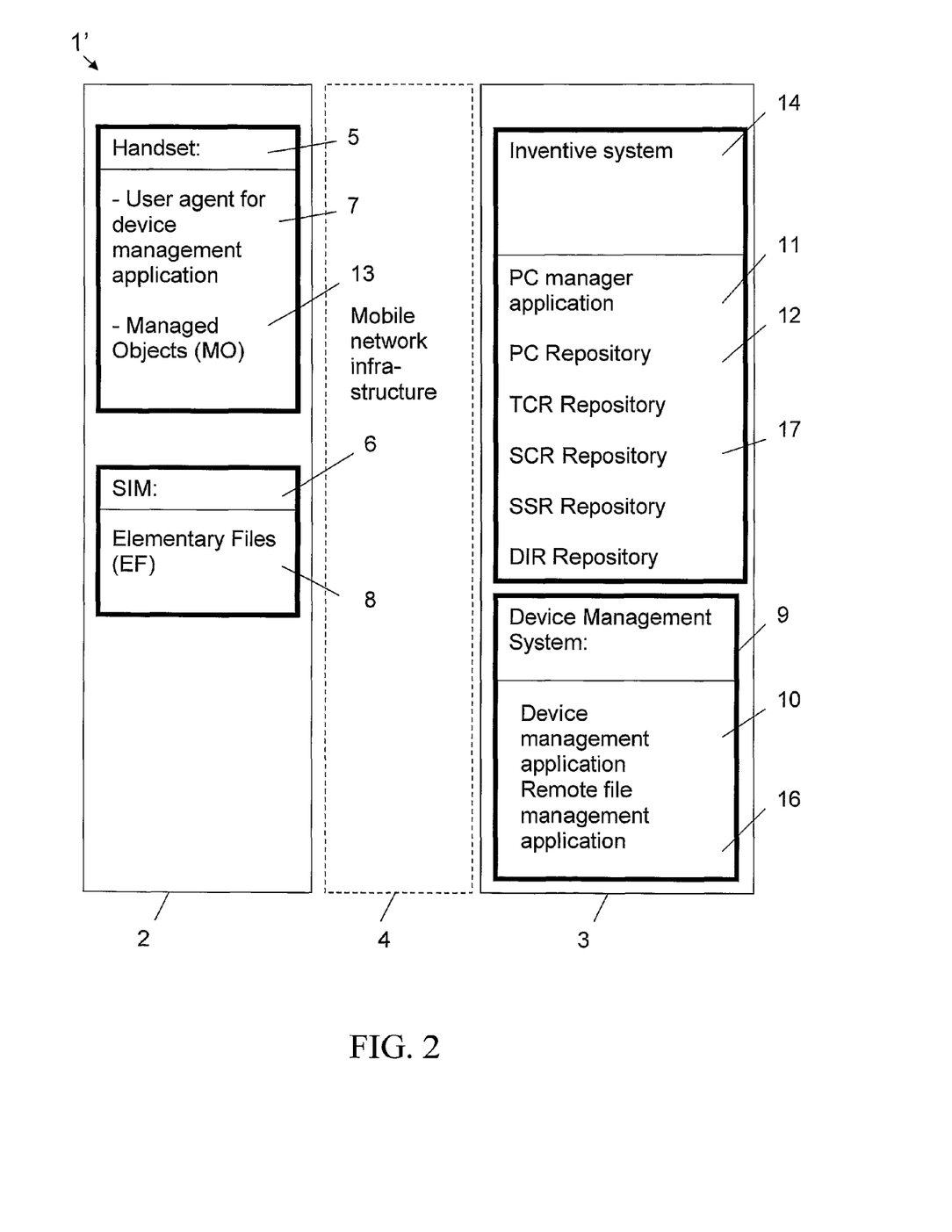
FIG. 2 is a view of an environment including the entities that implements the invention

FIG. 2 is a view of an environment that includes the entities that implements the method of the invention in addition to those presented in FIG. 1. The system 1' in FIG. 2 comprises components residing on both the mobile device 2 in FIG. 2 and on the server side 3 in FIG. 2. Again, the server side in the reality consists of several servers, one for each device management application and one for the system of the invention. The server including the system of the invention is in practice in an own server between the different device management applications 10, 16.

The system of the invention comprises
- a PC manager application 11, which performs inventive functions in the method of the invention
- a Provisioning Content Repository (PC) 12 that has been created so that a provisioning content (e.g. connectivity parameters (data)) are read into the repository. In this repository, there might for example be one set of connectivity parameters for OMA DM. The content is stored in a generic format.
- a Device Identities Repository (DIR) storing the mobile device identities as identified by a terminal identity and a subscription identity [IMEI, MSISDN]. Device Identity Repository is needed for the device discovery and for figuring out if this device should be an object for device management operations. It is needed before the inventive part of method.
- a Terminal Capabilities Repository (TCR) storing information about what OTA provisioning protocols a terminal may be provisioned over. TCR also stores specific information about provisioning content format particulars when so needed. And the technology and application service capabilities.
- a SIM Card Capabilities Repository (SCR) storing information about the management objects (files) available on the SIM card and whether or not these file may be managed from remote.
- a Subscription- and SIM card relationship repository (SSR) storing information about the capabilities of the SIM card for a particular subscription. Thereby this repository provides the means to match a subscription with a SIM card type.

In FIG. 1, the DIR, TCR and SCR databases are together presented with the same reference number 17 even if they are separate databases.

The correct format for a provisioning content is determined by a complex combination of capabilities: the OTA protocol, even the OTA protocol version, the terminal vendor, terminal model, the subscription type and the SIM card type. It is very complex to know by which provisioning content format a mobile device may be provisioned with.

The capabilities of the mobile device reveal what features, provisioning protocols and provisioning content formats it is capable of understanding.

Thus, in summary, the mobile device 2 of FIG. 1 comprising the handset 5 and the SIM card 6 is subject of provisioning in an environment with several formats.

The data is provisioned over a standardized protocol, i.e. the OMA DM protocol in this example. The user agent 7 is the client side component required to carry out device management operations over the OMA DM protocol.

The invention covers an adaptive bridging feature that takes care of the management of provisioning content that is stored on the SIM card.

If the terminal cannot read provisioning content from SIM, or if the terminal does not support bootstrapping from the SIM card then the invention reads the parameters off the SIM, and returns them to (provision) the terminal instead and the invention can take the necessary actions to bootstrap the mobile device via the SIM card. Thus, the invention retrieves the provisioning content from the SIM card and converts the format into the applicable terminal bound OTA provisioning protocol. In this way, the provisioning content reaches its destination in the terminal, from the SIM card and back to the terminal where the parameters are installed. If the SIM card cannot store the provisioning content, then the invention provisions the terminal directly with parameters from a database on the server side. If the SIM card has not been pre-provisioned, the invention provisions the SIM card with the provisioning content, in order to let the terminal bootstrap via the SIM card. The method is based on a capabilities aware mobile device management system. What that means is that the system can determine how and by what means provisioning content is managed by a mobile device. This is achieved by the use of the capabilities repositories.

Figure 3:
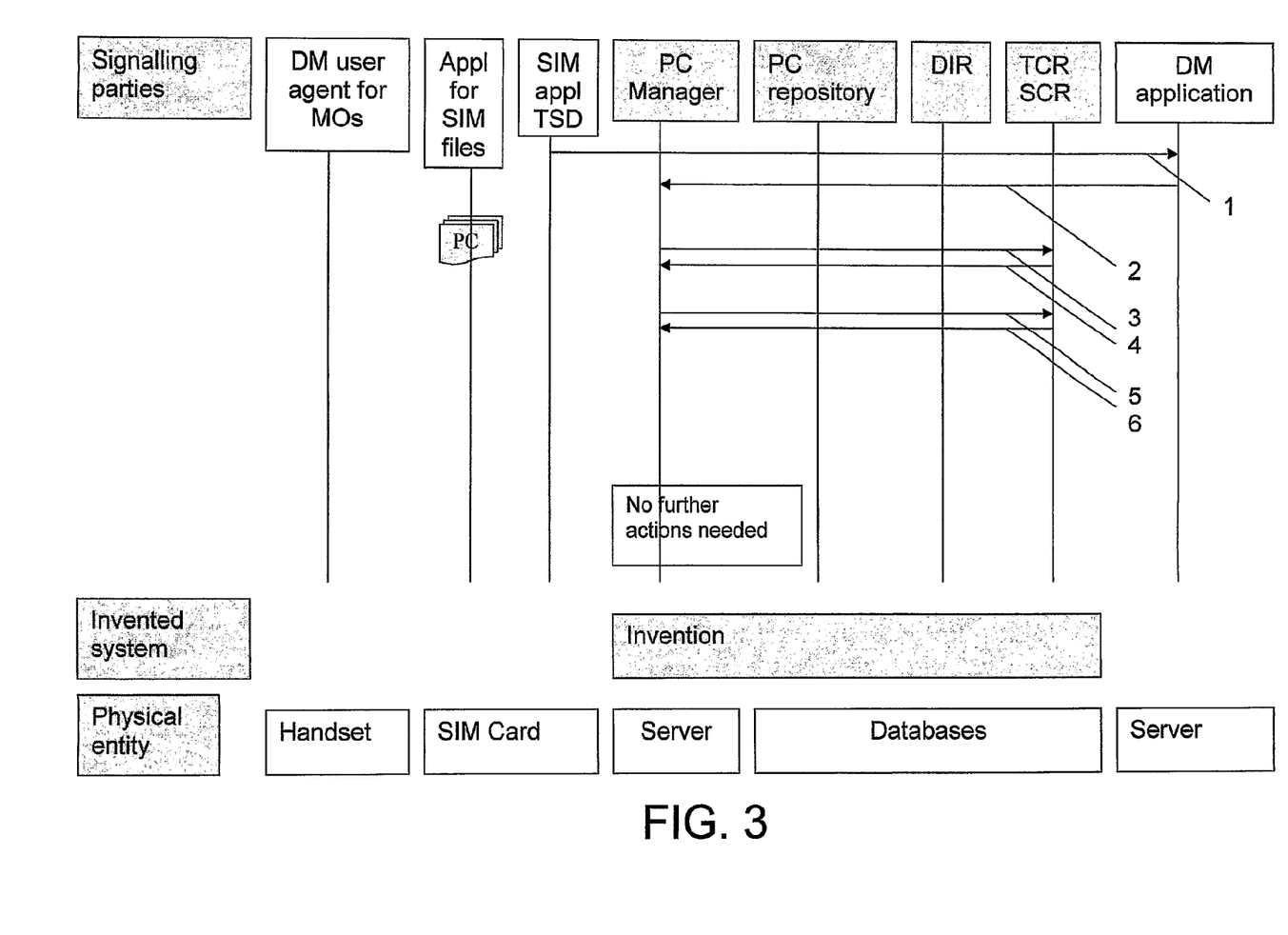
FIG. 3 presents a signal diagram of device discovery of a device with provisioning content (PC) present on the SIM card when the terminal supports bootstrap via the SIM card

FIG. 3 presents a signal diagram of device discovery of a device with provisioning content (PC) present on the SIM card when the terminal supports bootstrap via the SIM card FIG. 3 shows on the lowest row, the physical entities taking part in the method of the invention. These are the handset (equipment) and the SIM card, the servers on the server side, and the databases described above.

On the highest row of FIG. 3, the signaling parties in the system of the invention comprises the client side user agent for DM (in the handset), a SIM DM application (which is in the SIM card and handles the files), another SIM application that performs detection of terminal switches, a server side DM application (in the server side Device Management System).

The inventive part of the system is shadowed in FIG. 3. The inventive part comprises a PC manager application, which performs inventive functions in the method of the invention by means of the repositories described above in connection with FIG. 2, i.e. the Provisioning Content Repository (PC), the Device Identities Repository (DIR), the Terminal Capabilities Repository (TCR), the SIM Card Capabilities Repository (SCR) and the Subscription- and SIM card relationship repository (SSR).

Device management applications using e.g. OMA DM are typically used by mobile service providers. They are used for customer care purposes and to increase revenue by effective value added service management. Example use-cases involve service- and settings provisioning, device diagnostics, statistics, firmware- and software upgrade.

It is now assumed that e.g. a Service Provider or an operator wish to perform provisioning of contents in devices in a device management system in a mobile network infrastructure of e.g. a reason listed up in the foregoing paragraph.

In FIG. 3 it is assumed that the provisioning content (e.g. connectivity parameters (data) is present on the SIM card (set there in advance).

In step 1 of FIG. 3, the device is discovered by the system, revealing its device identity by [MSISDN, IMEI] in a previously known way.

In step 2, the PC manager is requested (by the DM application) to make sure that provisioning content is adaptively managed for this mobile device In steps 3 and 4, the PC manager checks if this device has PC on the SIM by use of the SCR In steps 5 and 6, the PC manager checks if the terminal supports bootstrap from the SIM card by use of the TCR No further actions needed as in this example, the SIM card was pre-provisioned, the terminal will bootstrap from the SIM.

Figure 4:
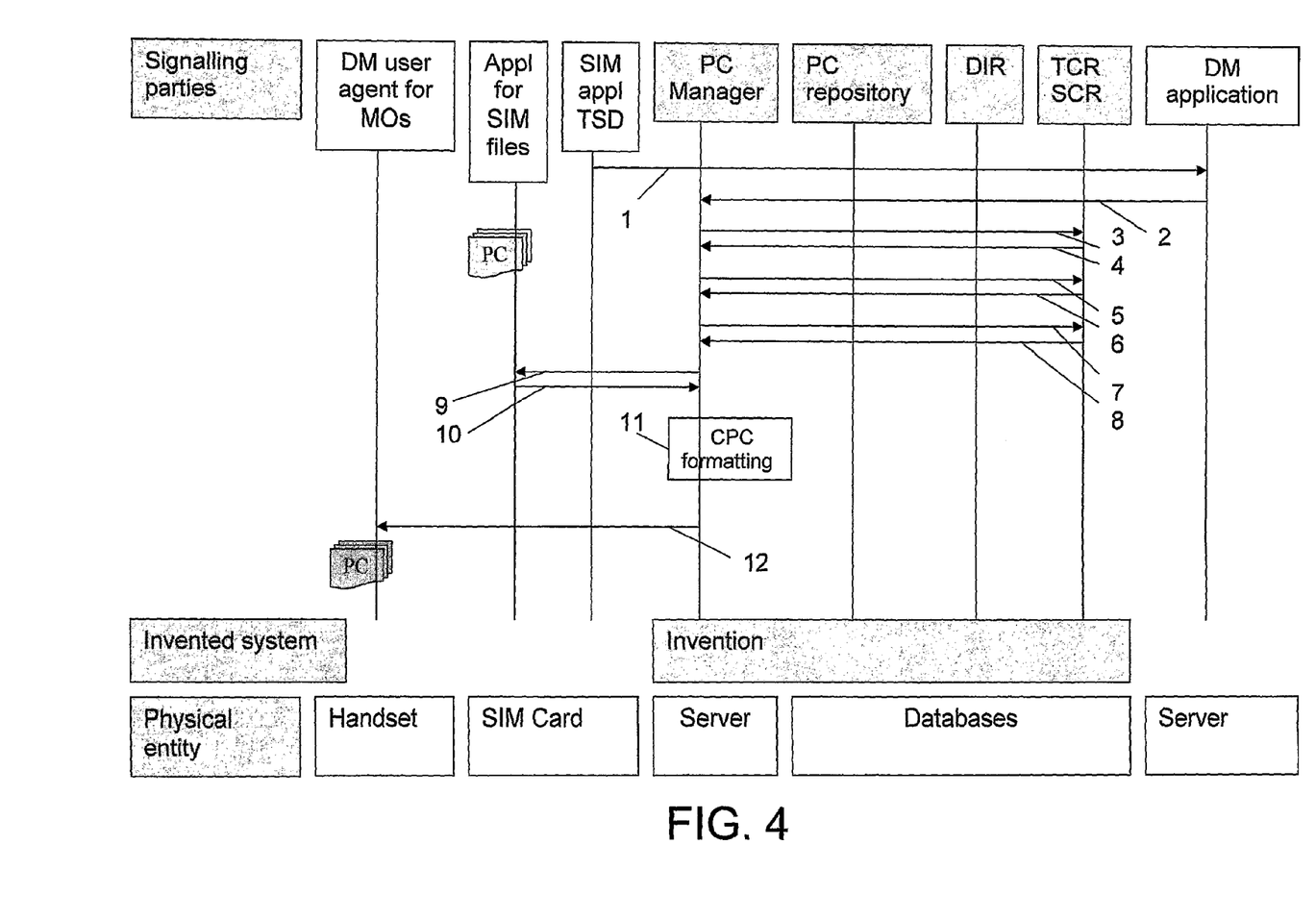
FIG. 4 presents an example of device discovery of a device with provisioning content (P)C present on the SIM card when the terminal does not support bootstrap from the SIM card for one or more of the application services.

FIG. 4 presents an example of device discovery of a device with provisioning content (PC) present on the SIM card when the terminal does not support bootstrap from the SIM card for one or more of the application services.

FIG. 4 shows on the lowest row, the physical entities taking part in the method of the invention. These are the servers on the server side, and the databases described above.

On the highest row of FIG. 4, the signaling parties in the system of the invention comprises the server side DM application (in the server side Device Management System) and the signaling parties in the inventive part of the system already described in connection with FIG. 3, i.e. a PC manager application, which performs inventive functions in the method of the invention by means of the repositories described above in connection with FIG. 2, i.e. the Provisioning Content Repository (PC), the Terminal Capabilities Repository (TCR), the SIM Card Capabilities Repository (SCR) and the Subscription- and SIM card type relationship repository (SSR).

It is again assumed that the provisioning content (e.g. connectivity parameters) are present on the SIM card.

In signal 1, the device is discovered by the system, revealing its mobile device identity by at least [MSISDN, IMEI]

In signal 2, the PC manager is requested (by a DM application) to make sure that provisioning content is adaptively managed for this mobile device.

In signals 3 and 4, the PC manager checks if this device has PC on the SIM by use of the SCR.

In signals 5 and 6, the PC manager checks if the terminal supports bootstrap from the SIM card and in this example it is assumed that the terminal does not.

In signals 7 and 8, the PC manager checks if the terminal supports OTA provisioning and in that case by what format and protocol.

In signals 9 and 10, the PC manager retrieves the PC from the SIM card, employing an SFM protocol.

In step 11, the PC manager converts the provisioning content into the applicable format.

In step 12, the terminal is provisioned Over-the-Air (OTA), employing an OTAP protocol.

The provisioning content has now been adaptively managed, i.e. it has been transferred from the SIM card to where it needed to be for this particular terminal in the terminal.

The invention provides a way of controlling the provisioning content by having it stored on the SIM card. Application service settings belong with the subscription. The mobile operator wants the subscriber to use his application services when the terminal is operated in the network by his subscription.

By means of the invention, the system is aware of both SIM card capabilities and terminal capabilities. There is a terminal capabilities repository and a SIM card capabilities repository. The combination of the two forms a characteristic benefit and unique value of the solution/invention.

The invention enables a seamless integration of SIM card management and terminal management. By seamless is meant that even if the provisioning content must reach the terminal, the mobile service provider can distribute and manage it on the SIM card.

The User need not be concerned with where the settings parameters of the provisioning content are actually stored in a particular mobile device, in SIM files or in the terminal. The invented system and method takes care of determining where, and transferring the provisioning content if needed.

While the present invention has been described in accordance with preferred compositions and embodiments, it is to be understood that certain substitutions and alterations may be made thereto without departing from the spirit and scope of the following claims.

The invention claimed is:

1. A method for provisioning content in a device management system to facilitate provisioning of mobile devices with contents of non-applicable formats independently of storage media in the device management system in a mobile network infrastructure, comprising:
   providing a mobile device having a terminal and a SIM (Subscriber Identity Module) card,
   providing the device management system with a device management application and repositories,
   the device management application checking capabilities of the mobile device from one or more repositories of the device management system with respect to the SIM card and provisioning content format,
   the device management application retrieving a provisioning content from the SIM card of the mobile device,
   the device management application determining that the retrieved provisioning content is in a format not supported by the terminal of the mobile device having the SIM card,
   the device management application converting the retrieved provisioning content into an applicable format supported by the terminal for provisioning the terminal,
   sending the converted provisioning content, retrieved from the SIM card of the mobile device, to the terminal, and
   provisioning the terminal with the converted provisioning content.

2. The method of claim 1 wherein the method further comprising providing a mobile network infrastructure with a GSM and a storage medium being a module in the mobile device, which has the SIM card.

3. The method of claim 1 wherein the method further comprising the retrieved provisioning content consisting of connectivity parameters for a service.

4. The method of claim 1 wherein the method further comprising the retrieved provisioning content consisting of any data parameter subject to a provisioning by the device management system.

5. The method of claim 1 wherein the method further comprising the device management application retrieving a terminal type out of an International Mobile Equipment Identity (IMEI) and looking up a corresponding provisioning protocol from a Terminal Capabilities Repository (TCR).

6. The method of claim 1 wherein the method further comprising the device management application retrieving a subscriber out of Mobile Station Integrated Service Digital Network Number (MSISDN) and looking up a SIM card type from a Subscription and SIM card type Relationship repository (SSR) and then a corresponding provisioning protocol from a SIM Card Capabilities Repository (SCR).

7. The method of claim 1 wherein the method further comprising the device management application looking up the retrieved provisioning content format corresponding to a provisioning protocol, terminal type and/or SIM card type.

8. The method of claim 4 wherein the method further comprising the device management application converting the retrieved provisioning content into an applicable provisioning content format of the mobile device.

9. The method of claim 1 wherein the method further comprising terminally bounding the converted provisioning content.

10. The method of claim 9 wherein the method further comprising managing data objects.

11. The method of claim 1 wherein the method further comprising the SIM card bounding the retrieved provisioning content before converting the retrieved provisioning content into an applicable format for provisioning.

12. The method of claim 11 wherein the method further comprising storing data objects to be managed in files on the SIM card.

13. A system for provisioning contents in a device management system to facilitate provisioning of a mobile device with contents of non-applicable formats independently of storage media in a device management system in a mobile network infrastructure, the system comprising:

a mobile device having a terminal and a SIM (Subscriber Identity Module) card,
a device management application and repositories,
one or more device capabilities repositories,
a device management application used for checking of capabilities of the mobile device from one or more repositories of the device management system,
means for retrieving a provisioning content from the SIM card of the mobile device,
means for determining that the provisioning content is in a format not supported by the terminal of the mobile device,
means for converting the provisioning content into an applicable format supported by the terminal of the mobile device, and
means for sending the converted provisioning content, retrieved from the SIM card of the mobile device, to the terminal and provisioning the terminal with the converted provisioning content.

14. The system according to claim 13 wherein one of the repositories consists of a terminal capabilities repository storing information about provisioning protocols to be used in the provisioning and/or about the provisioning content formats each mobile terminal type is provisioned by.

15. The system according to claim 13 wherein one of the repositories consists of the SIM card capabilities repository storing information about data objects available on a SIM card type.

16. The system according to claim 13 wherein one of the repositories consists of a Subscription and SIM card type relationship repository storing information about capabilities of the SIM card type for a particular subscription.

17. The system according to claim 13 wherein one of the repositories consists of a device identity repository storing the mobile device identities as identified by a terminal identity and a subscription identity.

18. The system according to claim 13 wherein the device management application has means for executing converting from SIM card format into a format of the terminal to fit capabilities of the terminal.

* * * * *